United States Patent [19]

Lee

[11] Patent Number: 4,763,209
[45] Date of Patent: Aug. 9, 1988

[54] AUTOREVERSE DOUBLE DECK SYSTEM

[75] Inventor: Kiu-Ahn Lee, Suwon, Rep. of Korea

[73] Assignee: Sam Sung Electronics Co., Ltd., Rep. of Korea

[21] Appl. No.: 911,188

[22] Filed: Sep. 24, 1986

[30] Foreign Application Priority Data

Sep. 25, 1985 [KR] Rep. of Korea ............... 85-7023[U]

[51] Int. Cl.$^4$ .................... G11B 15/44; G11B 15/12
[52] U.S. Cl. ........................ 360/74.1; 360/63
[58] Field of Search ............... 360/74.1–74.7, 360/63, 71

[56] References Cited

U.S. PATENT DOCUMENTS

| | | | |
|---|---|---|---|
| 3,315,041 | 4/1967 | Sampson | 360/63 |
| 4,003,089 | 1/1977 | Maurer | 360/63 |
| 4,309,729 | 1/1982 | Kice | 360/92 |
| 4,357,636 | 11/1982 | Taketomi et al. | 360/62 |
| 4,373,170 | 2/1983 | Sunaga et al. | 360/71 |
| 4,551,775 | 11/1985 | Koizumi et al. | 360/93 |

*Primary Examiner*—Raymond F. Cardillo
*Assistant Examiner*—David L. Robertson
*Attorney, Agent, or Firm*—Handal & Morofsky

[57] ABSTRACT

This invention relates to an autoreverse double deck system which enables the respective side of two tapes inserted in the double deck to be played or recorded continuously in sequential or alternative forwarding mode. A head selection switch 10 produces a timing pulse upon each autoreverse operation and a deck operation control unit 25 produces a clock pulse by differentiating the said timing pulse. The said clock pulse toggles two flip-flops $FF_1$ and $FF_2$ in turn. Switches $S_{31}$ and $S_{32}$ for deciding the deck operation mode respectively receive one of output signals of the said flip-flops and voltage of power supply B to turn on the associated motor driving transistor $Q_1$ and/or $Q_2$, whereby main motor $M_1$ and/or sub-motor $M_2$ can be rotated in a certain operation mode. A switch $S_4$ functions to select one motor to start preferentially between said motors $M_1$ and $M_2$. A pulse generator 15 or 20 produces a pulse for driving said selected motor $M_1$ or $M_2$ preferentially, when connected to said switch $S_4$.

4 Claims, 2 Drawing Sheets

AUTOREVERSE DOUBLE DECK SYSTEM

BACKGROUND OF THE INVENTION

This invention relates generally to a double deck system having an autoreverse function and particularly to a circuit for the double deck system, in which an autoreverse deck system is incorporated in the prior double deck audio system, so that a playing or recording can be carried out on one side or both sides of a stereo cassette tape (hereinafter referred to as a "tape") in one deck and then, a play or record can be done on one side or both sides of the tape in the other deck and, if necessary, the above-mentioned combination of play or record can be made repeatedly.

With respect to prior double deck audio systems, when a tape in a deck, for example, in a main deck is entirely wound on a winding reel or supply reel, all the parts necessary for turning the tape in the main deck are, owing to the functional autoreverse mechanism, placed on the stop mode and a tape in the sub-deck cannot be moved at all, as long as a button switch for driving the tape in the sub-deck is not pressed.

Accordingly, in case a continuous play or record is tried to make to tapes in both decks, there is an inconvenience to handle a button switch for driving one tape in a main or sub-deck by hand each time when and as soon as the other tape in any other deck stops.

As an improvement of the above prior double deck system, a system applying an autoreverse mechanism to each deck has been introduced. But this system has also had a function autoreversely turning the both sides of a type only in one of the decks. In a word, the system has no functional transfer of deck. Accordingly there remains a problem to operate a button switch for driving any other tape in the rest deck again, in order to move the tape continuously.

SUMMARY OF THE INVENTION

It is the object of this invention to provide a circuit for autoreverse double deck in which sequential or alternative play or record can be automatically or repeatly made to the both front and back sides of each tape inserted in the main and sub-deck, so that the above-mentioned problems of the prior art can be solved.

A circuit for driving a double deck machine based on the invention can accomplish a sequential forwarding function automatically playing or recording both sides of a tape in the main deck or sub-deck after or recording those of the other tape in main deck or sub-deck, alternative forwarding function automatically replaying or recording the one side of a tape in main deck or sub-deck and then, that of another tape, and then, any other side of the former tape and finally, that of the latter tape. Accordingly this invention has an advantage minimizing the number operating the button switch for continuously forwarding of the tape.

BRIEF DESCRIPTION OF THE DRAWINGS

The accompanying drawings illustrate the invention.

DETAILED DESCRIPTION OF THE INVENTION

Figure 1:
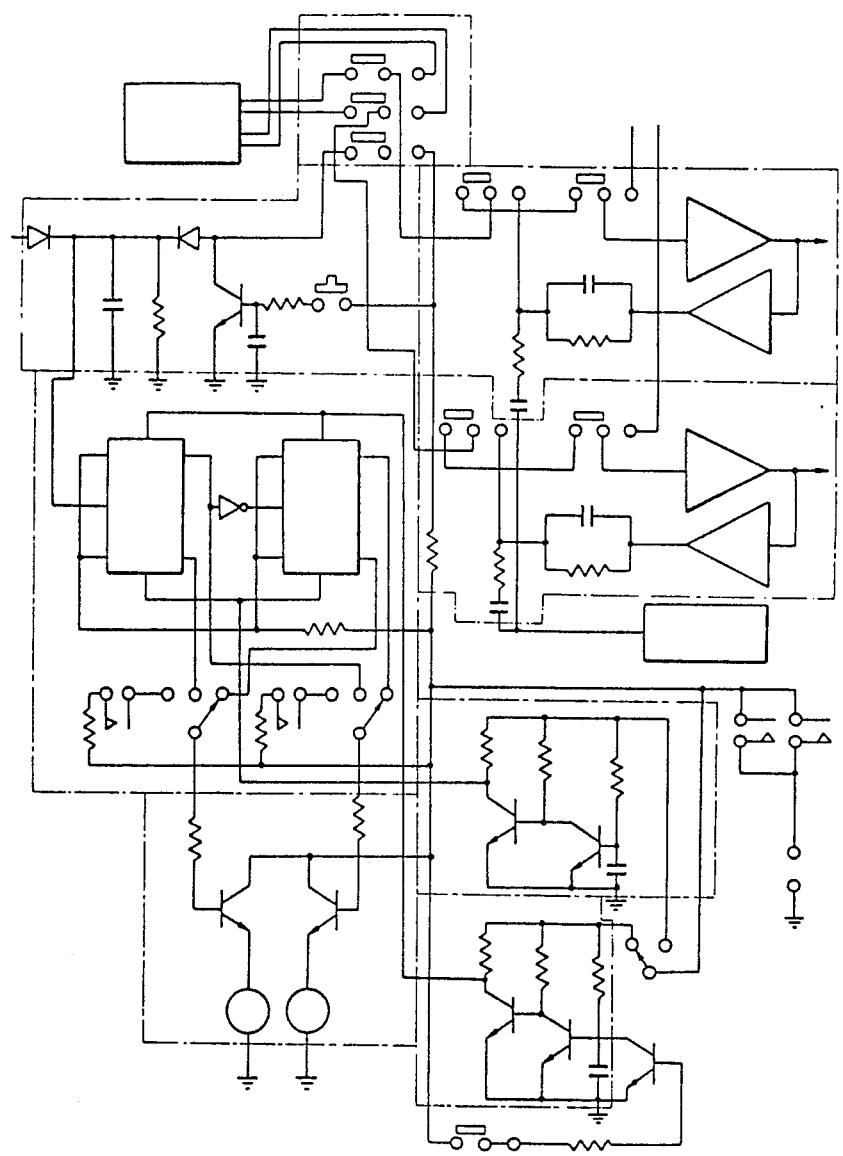
FIG. 1 is a circuit diagram of the autoreverse double deck system according to an embodiment of the invention.

Referring to FIG. 1, numeral 5 indicates an autoreverse head which can execute selective reproduction or recording of front side, namely Side A and back side, namely Side B of a four track stereo cassette tape able to be rotated in a right or reverse direction. This head is widely used in single deck audio system having autoreverse function.

With respect to autoreverse head 5, only one is, for convenience' sake, shown in FIG. 1, but it is provided to both the main and sub-decks respectively.

Numeral 10 is a head selection switch which is automatically switched through the autoreverse system as not shown in FIG. 1 and selects a periodic receipt in relation to a required core. Numerals 40 and 45 are a right channel reproducing and recording circuit and a left channel reproducing and recording circuit which treat a signal to right channel and a signal to left channel of a signal reproduced from or recorded on a tape through the foregoing head 5. Numeral 50 is a circuit providing a bias necessary for recording.

In the case of the foregoing circuits 10, 40, 45 and 50, only each one is, for convenience' sake, shown in FIG. 1 as in the case of head 5, but they are provided to main deck and sub-deck respectively. The foregoing circuits as not shown in FIG. 1 and corresponding to circuits 10, 40, 45 and 50 are provided to an anode of diode $D_1$.

Of head selection switch 10, both opposed contact points of the first switch $S_{11}$ are connected to cores R of the right channel on Side A and Side B of head 5 respectively and its intermediate contact points are connected to an intermediate contact point of reproducing/recording selection switch $S_{21}$ in the right channel reproducing/recording circuit 40. And both opposed contact points of the second switch $S_{12}$ are connected to cores L of the right channel on Side A and Side B of head 5 respectively and its intermediate contact point is connected to an intermediate contact point of the reproducing/recording selection switch $S_{23}$ in the left channel reproducing/recording circuit 45.

Movable contact segments of the first and second switches $S_{11}$ and $S_{12}$ are, under the conditions as shown in FIG. 1, electrically connected between Side A cores R and L of head 5 and the right and left channel reproducing/recording circuits 40 and 45, and these movable contact segments are, under the conditions as switched by autoreverse mechanism as not shown in FIG. 1, electrically connected between Side B cores R and L of head 5 and the right and left channel reproducing/recording circuits 40 and 45. The foregoing switches $S_{11}$ and $S_{12}$ are of a non-shorting type, in other words, a transfer under the conditions of non-short (circuit) between the opposed contact points at the time of transferring their movable contact segments. On the other hand, the third switch $S_{13}$ in a head selection switch 10 is a shorting type, in other word operating with, a transfer method placing under the conditions of temporary short (circuit) between the opposed contact points at the time of transferring their movable contact segments and, in case one side of both sides of tape is completely reproduced or recorded, the third switch $S_{13}$ are automatically transferred by autoreverse mechanism concurrently with producing a clock pulse.

The right and left channel play/record circuits 40 and 45 are the same to those used in the prior general audio system and Slide switches $S_{21}$–$S_{24}$ and have a functional simultaneous transit. Accordingly, at the time of play, each foregoing switch makes its movable contact segment connect contact point P to an intermediate contact point, and, at the time of record, it makes its movable contact segment connect an intermediate contact point of slide switches $S_{22}$ and $S_{24}$ are connected to preamplifiers $40a$ and $45a$ respectively. To contact points R and R of slide switches $S_{22}$ and $S_{24}$ respectively, record input signal RI from the outside microphone, tuner and tape recorder, etc. are input. The output Ro and Lo of the foregoing preamplifier $40a$ and $45a$ are connected to speakers through a power amplifier as not shown in FIG. 1 concurrently to the input of recording signal amplifier $40b$ and $45b$. The output of foregoing recording signal amplifier $40b$ and $45b$ are connected to contact points R and R respectively through frequency compensation means composed of resistors and condensors $R_5$, $C_5$ and $R_7$, $C_7$. Also a bias signal from recordal bias supply 50 are, by way of bias adjustment/regulation means respectively composed of resistors and condensors $R_6$, $C_6$ and $R_8$, $C_8$, applied to contact points R and R of slide switch $S_{21}$ and $S_{23}$.

With respect to numerals 5, 10, 40 and 45 as explained in the foregoing, a flow of play and record signal can, be adopting a right channel signal for the convenience of explanation, be described as follows:

In the case of play, R channel signal picked up by right channel core of Slide A or Slide B in head 5 is, by way of an intermediate contact point of the first switch $S_{11}$ in head selection switch 10, an intermediate contact point, movable contact segment and contact point P of slide switch $S_{21}$, a contact point P, movable contact segment and intermediate contact point of slide switch $S_{22}$ and lastly, preamplified $40a$ in turn, transferred to a speaker as not shown in FIG. 1. In the case of record, a right channel signal of the outside recording input signal RI is, by way of contact point R, movable contact segment and intermediate contact point of slide switch $S_{22}$, preamplifier $40a$, recording output $40b$, frequency compensation means $R_5$ and $C_5$, contact point R, movable contact segment and intermediate contact point of slide switch $S_{21}$ and lastly, an intermediate contact point of the first switch $S_{11}$ in head selection switch 10 in turn, applied to a right channel core of Side A or Side B in a head 5 and so, it is recorded to a prescribed track of tape.

The following is in explain circuits as commonly used to double deck system relating to this invention:

Deck operation control unit 25 is a unit outputing a clock signal for a deck operation control, by differentiating a pulse train as produced each time when a play or record is completed on one side of prescribed tape in compliance with a prescribed program for the operation of a double deck or by differentiating a pulse as produced for the optional change of the foregoing program during playing or recording one side of the prescribed tape in compliance with the foregoing program. The foregoing pulse train, which is, at the time of autoreverse, produced from the third switch $S_{13}$ of head selection switch 10, is applied to a differential circuit composed of resistor $R_1$ and condensor $C_1$ by way of diode $D_2$ and lastly, it is differentiated.

Means producing a pulse for the optional change of the foregoing program consist of push button switch $S_5$, resistor $R_2$, condensor $C_2$ and transistor $Q_3$, etc. Each time the push button switch $S_5$ is pressed once, transistor $Q_3$ turns on for the fixed time as prescribed by resistor $R_2$ and condensor $C_2$ and then, it turns off and lastly, an optional pulse is obtained.

Diodes $D_1$ and D are provided to prevent a pulse train, which is, at the time of autoreverse, produced from the third switch $S_{13}$ of two head selection switch 10, as provided for double deck, from flowing backward to another deck.

Deck operation mode selection unit 30 is composed of two flip-flops $FF_1$ and $FF_2$ which toggles in response to the clock signal as output from the foregoing operation control unit 25, and two coupled switches $S_{31}$ and $S_{32}$, which select any one of output voltage of the foregoing flip-flop $FF_1$ and $FF_2$ deciding a deck operation mode.

Explaining in detail, clock output 6 of deck operation control unit 25 is connected to a terminal CK of flip-flop $FF_1$ and positive output $Q_1$ is connected to a terminal of flip-flop $FF_2$ by way of invertor IN.

Also all the inputs J and K of the both flip-flops $FF_1$ and $FF_2$ are, by way of a resistor $R_{17}$, connected to a node Y and this node Y is, by way of leaf switch $SL_3$ and $SL_4$, connected to the positive terminal of power supply B.

Positive output $X_1$ and $X_2$ of flip-flops $FF_1$ and $FF_2$ are connected to contact points 12 and m2 of switch $S_{32}$ respectively. The foregoing contact points 11 and 12 function as a transmitting terminal of a signal alternatively forwarding the double deck and the foregoing contact points m1 and m2 acts as a transmitting terminal of a signal sequentially forwarding a tape in the double deck.

Contact points n1 and n2 function as a transmitting terminal of a signal for operating each one of the decks with normal operation mode and each one of these contact points n1 and n2 is, by way of leaf switch $SL_1$ and $SL_2$ and resistor $R_{18}$ and $R_{19}$, connected to a node Y.

Each movable contact arm of switches $S_{31}$ and $S_{32}$ is connected to any one of the foregoing contact points 11, m1 and n1, and, 12, m2 and n2 and so, it takes over a prescribed signal and outputs to motor driving unit 35 as described below. The leaf switches $SL_1$ and $SL_3$ is scheduled to short at the time of driving the main deck and the leaf switches $SL_2$ and $SL_4$ is scheduled to short at the time of driving the sub-deck.

A motor driving unit 35 is composed of transistors $Q_1$ and $Q_2$ which is operated by receiving an output signal from the foregoing switch $S_{31}$ and $S_{32}$ through resistor $R_9$ and $R_{10}$. These transistors is scheduled to drive main and sub-motors as provided to main and sub-decks respectively.

Explaining a composition of this motor driving unit 35 in detail, a movable contact arm of switches $S_{31}$ and $S_{32}$ is, by way of resistors $R_9$ $R_{10}$ and diodes $D_3$ and $D_4$ respectively, connected to the base of transistors $Q_1$ and $Q_2$, and a collectors of transistor $Q_1$ and $Q_2$ is commonly connected to a node Y. And emitters of transistors $Q_1$ and $Q_2$ are connected to motors $M_1$ and $M_2$.

Accordingly, when a output signal of switch $S_{31}$ or $S_{32}$ is high (level), transistor $Q_1$ or $Q_2$ turns on and then, a voltage of power supply B is applied to motor $M_1$ or $M_2$ and finally, motor $M_1$ or $M_2$ rotates in one direction.

Reference symbol $S_6$ is a dubbing switch. Its contact points f1 and f2 are interconnected and are connected to the node Y. Another contact point f3 is, by way of diodes and resistor $D_5$ and $R_{15}$, and $D_6$ and $R_{16}$, connected to each base of transistors $Q_1$ and $Q_2$. At the time of normal operation mode, a movable contact segment of the dubbing switch is positioned between the contact points f1 and f2. At the time of dubbing mode, the movable contact segment is positioned between the contact points f2 and f3. In this case, transistors $Q_1$ and $Q_2$ turn on simultaneously, whereby motors $M_1$ and $M_2$ can be rotated concurrently.

A switch $S_4$ is provided to select one motor to be preferentially started between main motor $M_1$ and sub-motor $M_2$ in the double deck system, which has been put into the sequential forwarding mode or the alternative forwarding mode, comprising a contact point g1 connected to a pulse generator 15 for generating a pulse to start the main motor $M_1$ preferentially, a contact point g2 connected to a pulse generator 20 for generating a pulse to start the sub-motor $M_2$ preferentially, and a movable contact arm connected to the foregoing node Y.

A generating pulse 15 comprises transistor $Q_4$ and $Q_5$, resistors $R_3, R_{11}$ and $R_{12}$, and a condensor $C_3$. A collector and base of transistor $Q_4$ and a base of transistor $Q_5$ are, by way of resistors $R_{11}, R_{12}$ and $R_3$ respectively, connected to the contact point g1 commonly, and the base of transistor $Q_4$ and the collector of transistor $Q_5$ are interconnected. Also emitters of transistors $Q_4$ and the collector of transistor $Q_5$ are commonly grounded, and a condensor $C_3$ is connected between the base and emitter of transistor $Q_5$.

And the collector of transistor $Q_4$ is connected to a clear terminal CL of flip-flops $FF_1$ and $FF_2$ in the foregoing deck operation mode selection unit 30.

Under this construction, as the condensor $C_3$ is put on non-charged condition immediately when the movable contact arm of the switch $S_4$ is connected to the contact point g1, the transistor $Q_5$ is put in an off condition. At the same time, as a power supply B is applied to the base of transistor $Q_4$ throught the resistor $R_{12}$, the transistor $Q_4$ turns on and its collector potential becomes a low level, whereby the flip-flops become clear. At this time, this condition is maintained for a predetermined period, which is determined by the resistor $R_3$ and the condensor $C_3$. After that, when the condensor $C_3$ is charged to more than a certain level, the transistor $Q_5$ turns on and a base potential of the transistor $Q_4$ falls to a low level, whereby the transistor $Q_4$ turns off and its collector potential rises to a high level and so, a clear operation of the flip-flops is released. As mentioned in the above, as all outputs $\overline{X_1}$ and $\overline{X_2}$ of the flip-flops $FF_1$ and $FF_2$ are positioned on a high level in the case of applying a clear pulse from the pulse generator 15 to the flip-flops $FF_1$ and $FF_2$, the transistor $Q_1$ turns on and so, the main motor $M_1$ is preferentially drived, as long as the deck operation mode selection switch $S_{31}$ is connected to the contact point l1 or m1.

The pulse generator 20 comprises transistor $Q_6$ and $Q_7$, resistors $R_{13}, R_{14}$ and $R_4$, and condensor $C_4$. These elements are the parts corresponding to transistor $Q_4$ and $Q_5$, resistor $R_{11}, R_{12}$ and $R_3$, and condensor $C_3$ respectively.

A construction of circuit in the pulse generator 20 is the same to that in the pulse generator 15, except that one ends of the resistors $R_{13}, R_{14}$ and $R_4$ are commonly connected to the contact point g2 and the collector of transistor $Q_6$ is connected to a present terminal PR of the flip-flops $FF_1$ and $FF_2$. Of course, the principle for generating a pulse in the pulse generator 20 is the same to that in the pulse generator 15.

Figure 2A:
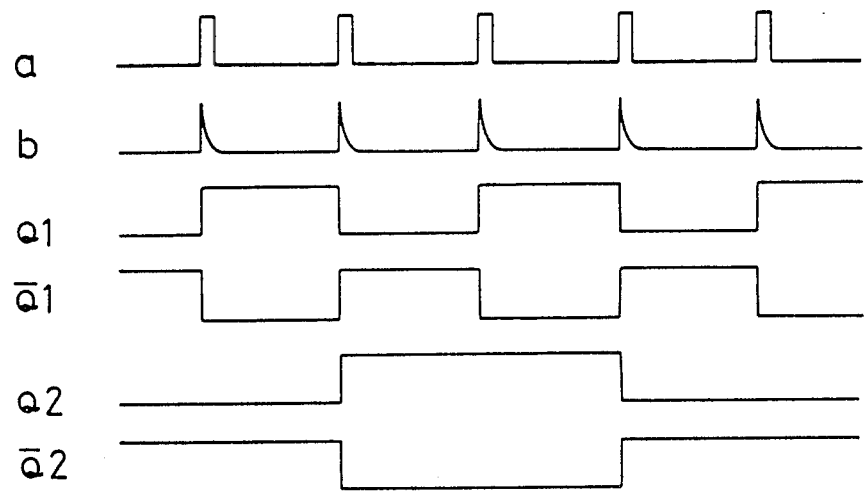
FIGS. 2A and B is a timing chart illustrating the operation of the essential parts shown in FIG. 1.
Figure 2B:
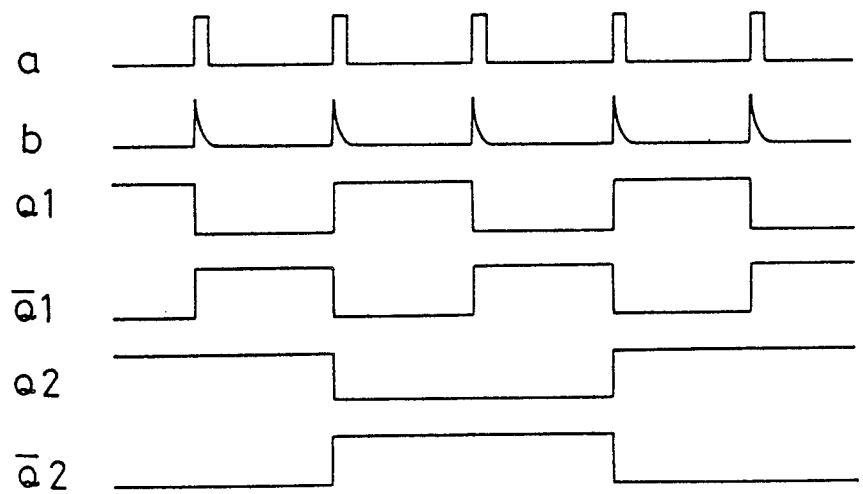

Under these circumstances, as all outputs $X_1$ and $X_2$ of the flip-flops $FF_1$ and $FF_2$ becomes a high level in the case of applying a preset pulse from the pulse generator 20 to the flip-flops $FF_1$ and $FF_2$, the transistor $Q_2$ turns on and makes the sub-motor $M_2$ start preferentially, as far as the deck operation mode selection switch $S_{32}$ is connected to the contact point l2 or m2. Referring to FIG. 1 and FIG. 2, it can be explained the process that tapes in the double deck accomplished sequential forwarding function and alternative forwarding function in accordance with the circuits of this invention.

In order to start the main motor $M_1$ preferentially, it is assumed that the movable contact arm of the switch $S_4$ has been connected to the contact point g1. And then, the flip-flops $FF_1$ and $FF_2$ become clear by the pulse coming from the pulse generator 15 and so, the outputs $X_1$ and $X_2$ are put on a low level and $\overline{X_1} \overline{X_2}$ are put on a high level.

Then the movable contact arms of the deck operation mode selection switches $S_{31}$ and $S_{32}$ are connected to the contact points l1 and l2, respectively, and the outputs $X_2$ and $\overline{X_2}$ of the flip-flop $FF_2$ are applied to the bases of the transistors $Q_1$ and $Q_2$. At this time, only the transistor $Q_1$ turns on and so, the main motor $M_1$ starts preferentially. After that, when one side of the tape, for example Side A in the main deck forwards completely, the head selection switch 10 is switched by autoreverse mechanism as not shown in FIG. 1 and simultaneously, a pulse as shown in FIG. 2 (A) a is generated from a shorting type of the third switch $S_{13}$ and this pulse is differentiated by the deck operation control unit 25 and is applied to CK of the flip-flop $FF_1$. Then the flip-flop $FF_1$ is triggered by a rising edge of the clock pulse and the outputs $X_1$ and $X_2$ of the flip-flop $FF_1$ are transmitted.

But, as the flip-flop $FF_2$ is scheduled to be triggered by a falling adge of the output $X_1$ of the flip-flop $FF_1$, the outputs $X_2$ and $\overline{X_2}$ remain unchanged, though a pulse is generated from the third switch $S_{13}$.

Accordingly the main motor $M_1$ continues to be rotated and simultaneously, the other side of tape in the main deck, for example Side B is rotated. Subsequently, when the above Side B is completely rotated, a pulse is again generated from the third switch. Accordingly the flip-flop $FF_2$ is toggled by the reason of the foregoing principle and the outputs $X_2$ and $\overline{X_2}$ thereof are positioned on a high level from a low level. Then the transistor $Q_2$ of the sub-deck is turned on by the high level output $X_2$ and so, the sub-motor is rotated. Consequently one side of tape in the sub-deck, namely Side A is rotated. When this Side A is completely rotated, the third pulse a is generated from the third switch $S_{13}$.

But, as shown in $X_2$ and $\overline{X_2}$ of FIG. 2 (A), the outputs $X_2$ and $\overline{X_2}$ are positioned on a high level and a low level respectively and subsequently, the sub-motor $M_2$ continues to rotate Side B of tape in the sub-deck. After that, when Side B of the above tape forwards completely, the fourth pulse a is generated and so, the outputs $X_2$ and $\overline{X_2}$ of the flip-flop $FF_2$ are changed and the motor $M_1$ of the main deck is rotated, thereby Side A of the tape in the main deck forwards.

Putting the above processes together, in case the outputs $X_2$ and $\overline{X_2}$ of the flip-flop $FF_2$ are selected by the switches $S_{31}$ and $S_{32}$, the flip-flop $FF_2$ is exchanged once when the output pulse is generated twice, and Side A and Side B of the tape in the main deck forward and after that, Side A and Side B of the tape in the sub-deck forward in turn. Therefore a sequential forwarding function can be accomplished.

In the meantime, in case the movable contact arm of the switch $S_4$ is connected to the contact point $g_1$ and the movable contact arms of the switches $S_{31}$ and $S_{32}$ are connected to the contact points $m_1$ and $m_2$ respectively, the outputs $X_1$ and $\overline{X}_1$ of the flip-flop $FF_1$ are selected and applied to the bases of the transistors $Q_1$ and $Q_2$. As shown in FIG. 2 (A), the outputs $X_1$ and $\overline{X}_1$ of the flip-flop are inverted each time a clock pulse is input. This indicates that the motor $M_1$ of the main deck and the motor $M_2$ of the sub-deck are operated alternatively. Consequently, after Side A of the tape in the main deck forwards, and Side A of the tape in the sub-deck, Side B of the tape in the main deck and Side B of the tape in the sub-deck forward in turn, and thereby, an alternative forwarding function can be accomplished.

In the next, in case the movable contact arm of the switch $S_4$, selecting an order of the deck operation, is connected to the contact point $g_2$, the motor $M_2$ of the sub-deck starts earlier than the motor $M_1$ of the main deck, and the flip-flops $FF_1$ and $FF_2$ are operated as shown in the timing chart of FIG. 2 (A). Therefore, on the contrary to the foregoing processes, the tape in the sub-deck starts and is rotated preferentially and consequently, any other sequential forwarding function or alternative forwarding function can be accomplished. This depends upon a difference of the connecting position of the deck operation mode selection switches $S_{31}$ and $S_{32}$.

As explained in the foregoing, this invention, namely autoreverse double deck system has advantages, not only to reduce the number for operating the button switch which is necessary for continuous forwarding of the tape in the double deck, but also to play or to record the tape for a long time pursuant to an order as users want.

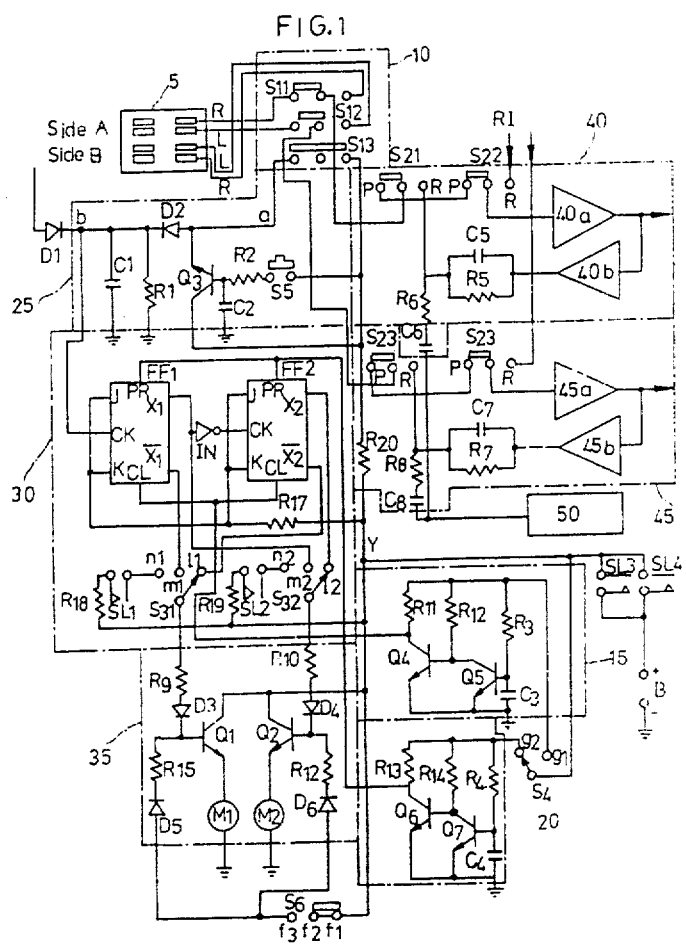

What is claimed is:

1. An autoreverse double deck control system comprising;
   (a) a head selection switch which is automatically switched by an autoreverse mechanism which selects an electric connecting configuration to selected core elements of an autoreverse head and generates a pulse at each time when autoreverse is desired;
   (b) a deck operation control unit for generating pulses for the optional change of a predetermined program for the operation of said double deck system, differentiating a pulse as generated from the head selection switch at the time of autoreverse and outputing a clock signal for the deck operation control; (c) two flip-flops toggling in response to a clock signal output from the said deck operation control unit; said two flip-flops having outputs;
   (d) at least two supply transistors;
   (e) a deck operation mode selection unit having two coupled switches which connect to a power supply one of said supply transistors, said transistors being triggered by a respective one of said flip-flops and being coupled to respective driving motors in the double deck system, one of said motors being a main motor and the other of said motors being a submotor;
   (f) a switch selecting a preferential driving motor as between said main motor and said submotor in said double deck system to result in a sequential forwarding mode or an alternative forwarding mode in response to the position of said coupled switches;
   (g) first pulse generator means for generating a pulse for default starting of said main motor by setting said flip flops; and
   (h) second pulse generator means for generating a pulse for default starting of said sub-motor by resetting said flip flops.

2. A double-deck tape recording and playing control system, comprising:
   (a) an auto reverse tape head, comprising
      (i) a forward right channel head section;
      (ii) a forward left channel head section;
      (iii) a reverse right channel head section; and
      (iv) a reverse left channel head section;
   (b) a main deck motor;
   (c) a sub deck motor;
   (d) first power supply means for powering said main deck motor and having a control input;
   (e) second power supply means for powering said sub deck motor and having a control input;
   (f) first bistable means having first and second complementary outputs for controlling said first and second power supply means, respectively;
   (g) second bistable means having first and second complementary outputs for controlling said first and second power supply means, respectively;
   (h) two section switch selection means having selectable contact sets coupled respectively to said outputs of said first and second bistable means, and having selector contacts coupled to said control inputs of said first and second power supply means said selector contacts being connectable to the set corresponding to the output of said first bistable means or to the set corresponding to the output of said second bistable means for selecting between playing two sides of a tape in a main deck and then two sides of a tape in a sub deck or the forward side of tapes in both decks followed by reverse sides of tapes in both decks;
   (i) invertor means for coupling said second bistable means to said first bistable means;
   (j) selectable pulse generating means for setting said first and second bistable means in selected complementary states to select between default driving of said main deck motor or said sub deck motor;
   (k) a recording and playing audio system; and
   (l) tape head selection means responsive to said selectable pulse generating means and said two section switch selection means to connect selected head sections to said audio systems.

3. An autoreverse double deck control system comprising:
   (a) a head selection switch for selecting an electric connecting configuration to selected elements of an autoreverse head and generating a pulse at each time when autoreverse playing is desired, said head selection switch being operatingly associated with an autoreverse mechanism;
   (b) a deck operation control unit for generating a clock signal for the deck operation control by differentiating the pulse coming from said head selection switch;
   (c) a deck operation mode selection unit for choosing one of a plurality of operation modes in which the respective double decks are played in sequence or alternately said unit consisting of
      (i) two flip-flops toggling in response to said clock signal from said deck operation control unit; and (ii) two coupled switches for respectively receiving output signals of said two flip-flops and a DC voltage of a power source and selectively supplying one of them for the corresponding power transistors, one of said transistors driving a main motor, the other of said transistors driving a submotor;

(d) a switch for selecting a motor to be preferentially driven between said motors in a sequential forwarding mode or an alternative forwarding mode in response to the position of said coupled switches;

(e) a pulse generator for generating a pulse to be applied to CLEAR terminals of said two flip-flops in response to a first position of said switch so as to start said main motor preferentially; and (f) a pulse generator for generating a pulse to be applied to PRESET terminals of said two flip-flops in response to a second position of said switch so as to start said sub motor preferentially.

4. An autoreverse double deck control system according to claim 3, wherein said deck operation control unit further includes pulse generating means to be manually actuated for the optional change of a predetermined program for the operation of said double deck system, a pulse generated by said pulse generating means being differentiated by said deck operation control unit and then being applied to CLOCK terminals of said two flip-flops to toggle said flip-flops.

* * * * *

UNITED STATES PATENT AND TRADEMARK OFFICE
CERTIFICATE OF CORRECTION

PATENT NO. : 4,763,209
DATED : August 9, 1988
INVENTOR(S) : Kiu-Ahn LEE

It is certified that error appears in the above-indentified patent and that said Letters Patent is hereby corrected as shown below:

IN THE DRAWINGS

Figure 1 should appear as shown on the attached page:

Signed and Sealed this

Twelfth Day of October, 1993

BRUCE LEHMAN

Attest:

*Attesting Officer*  *Commissioner of Patents and Trademarks*

UNITED STATES PATENT AND TRADEMARK OFFICE
CERTIFICATE OF CORRECTION

PATENT NO. : 4,763,209

DATED : August 9, 1988

INVENTOR(S) : Kiu-Ahn LEE

It is certified that error appears in the above-indentified patent and that said Letters Patent is hereby corrected as shown below: